(12) United States Patent
Hori et al.

(10) Patent No.: US 9,791,046 B2
(45) Date of Patent: Oct. 17, 2017

(54) ROTARY MACHINE

(75) Inventors: Takumi Hori, Tokyo (JP); Hiroshi Funakoshi, Tokyo (JP); Manabu Maeda, Tokyo (JP); Hidekazu Uehara, Tokyo (JP); Kazuhiko Yamashita, Tokyo (JP); Zenichi Yoshida, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 128 days.

(21) Appl. No.: 13/638,950

(22) PCT Filed: Oct. 27, 2011

(86) PCT No.: PCT/JP2011/074768
§ 371 (c)(1),
(2), (4) Date: Oct. 2, 2012

(87) PCT Pub. No.: WO2013/061436
PCT Pub. Date: May 2, 2013

(65) Prior Publication Data
US 2013/0106062 A1    May 2, 2013

(51) Int. Cl.
*F16J 15/54*    (2006.01)
*F16J 15/40*    (2006.01)
*F16J 15/34*    (2006.01)

(52) U.S. Cl.
CPC ........... *F16J 15/40* (2013.01); *F16J 15/3404* (2013.01); *F16J 15/3492* (2013.01)

(58) Field of Classification Search
CPC .............................. F16J 15/3404; F16J 15/40
(Continued)

(56) References Cited

U.S. PATENT DOCUMENTS 5,147,015 A * 9/1992 Snuttjer ............... F16J 15/406
                                                 184/104.1
6,607,348 B2 * 8/2003 Jean ...................... F04D 29/122
                                                 277/408
(Continued)

FOREIGN PATENT DOCUMENTS

EP    1 270 950         1/2003
JP    52-090682         7/1977
(Continued)

OTHER PUBLICATIONS

Japanese Office Action dated Dec. 20, 2013 issued in corresponding Japanese Application No. 2010-103798 (with English translation).
(Continued)

*Primary Examiner* — Matthieu F Setliff
*Assistant Examiner* — Thomas Neubauer
(74) *Attorney, Agent, or Firm* — Wenderoth, Lind & Ponack, L.L.P.

(57) ABSTRACT

A rotary machine has a housing that houses a fluid in a supercritical state, a rotary shaft that penetrates the housing, rotation rings that rotate integrally with the rotary shaft, and stationary rings that contact the rotation rings when the rotary shaft is stopped, the stationary rings being positioned in a state in which sealing gaps are defined between the rotation rings and the stationary rings when the rotary shaft rotates, a circulating pipe path that supplies a portion of the fluid to inlet portions of the sealing gaps, a temperature-adjusting device that adjusts a temperature of the fluid in the circulating pipe path, and a control unit that controls operation of the temperature-adjusting device so as to heat the inlet portions of the sealing gaps to a predetermined temperature before the rotary shaft is driven.

11 Claims, 11 Drawing Sheets

(58) Field of Classification Search
USPC ................ 277/359, 361–364, 370–371, 346, 277/431–432
See application file for complete search history.

(56) References Cited

U.S. PATENT DOCUMENTS

| | | | | |
|---|---|---|---|---|
| 6,685,192 | B2* | 2/2004 | Takigahira et al. | 277/408 |
| 6,715,985 | B2 | 4/2004 | Delrahim et al. | |
| 6,783,193 | B2* | 8/2004 | Yamaguchi et al. | 303/116.4 |
| 8,186,688 | B2* | 5/2012 | Akiyama | F16J 15/3412 277/362 |
| 2003/0042681 | A1* | 3/2003 | Takahashi | 277/349 |
| 2007/0151454 | A1* | 7/2007 | Marwitz | B01D 53/75 96/7 |
| 2009/0140495 | A1* | 6/2009 | Dreifert et al. | 277/431 |
| 2009/0290971 | A1 | 11/2009 | Shamseldin et al. | |
| 2010/0212493 | A1 | 8/2010 | Rasmussen et al. | |
| 2010/0270749 | A1* | 10/2010 | Oshii | F16J 15/004 277/361 |
| 2013/0012028 | A1* | 1/2013 | Stern | C09K 13/04 438/753 |

FOREIGN PATENT DOCUMENTS

| | | |
|---|---|---|
| JP | 59-147659 | 8/1984 |
| JP | 61-29166 | 2/1986 |
| JP | 61-93670 | 6/1986 |
| JP | 62-147764 | 9/1987 |
| JP | 63-8205 | 1/1988 |
| JP | 02-292579 | 12/1990 |
| JP | 3-22173 | 3/1991 |
| JP | 3-22173 | 6/1991 |
| JP | 3-130968 | 12/1991 |
| JP | 2612673 | 5/1997 |
| JP | 11-107705 | 4/1999 |
| JP | 2002-13645 | 1/2002 |
| JP | 2002-267027 | 9/2002 |
| JP | 2003-28094 | 1/2003 |
| JP | 2004-190783 | 7/2004 |
| JP | 2008-175182 | 7/2008 |
| JP | 2011-504136 | 2/2011 |
| JP | 2011-522175 | 7/2011 |
| JP | 2011-231880 | 11/2011 |
| WO | 2005/090793 | 9/2005 |
| WO | 2009/107440 | 9/2009 |

OTHER PUBLICATIONS

Extended European Search Report dated Jul. 17, 2015 issued in European Application No. 11864131.5.
International Search Report dated Dec. 6, 2011 in International (PCT) Application No. PCT/JP2011/074768 with English translation.
Written Opinion of the International Searching Authority dated Dec. 6, 2011 in International (PCT) Application No. PCT/JP2011/074768 with English translation.
Chinese Office Action dated Jul. 2, 2014 issued in corresponding Chinese Patent Application No. 201180021545.5 (with English translation).

* cited by examiner

ROTARY MACHINE

TECHNICAL FIELD

The present invention relates to a dry gas seal structure that is provided so as to penetrate a housing.

BACKGROUND ART

In a rotary machine in which a rotation shaft is provided so as to penetrate a housing, a dry gas seal structure is widely used as a seal structure for sealing a gap between the rotation shaft and the housing (for example, refer to Japanese Unexamined Patent Application, First Publication No. 2004-190783). Here, FIG. 13 is a schematic vertical cross-sectional view showing a dry gas seal structure 70 according to an example of the related art. As shown in the drawing, the dry gas seal structure 70 includes rotation rings 72 that are fixed to a rotary shaft 71 and integrally rotate, and stationary rings 74 that are provided in a housing 73 so as to face the rotation rings 72, spiral grooves (not shown) are formed on the surfaces of the rotation rings 72, and the stationary rings 74 are pressed toward the rotation rings 72 due to coil springs 75. According to such a configuration, when the rotary shaft 71 is not rotated, the rotation rings 72 and the stationary rings 74 are in contact with each other due to the spring force of the coil springs 75. On the other hand, when the rotary shaft 71 rotates, gas in the housing 73 is introduced into the inside of the spiral groove, and small sealing gaps 76 are caused between the rotation rings 72 and the stationary rings 74 due to the resulting dynamic pressure effect. In addition, only a small amount of the gas in the housing 73 leaks outside through the small sealing gaps 76 so that the gap between the rotary shaft 71 and the housing 73 is sealed.

Problems to be Solved by the Invention

However, in a case in which the dry gas seal structure 70 of the related art is applied to a pump having a high discharge pressure, such as a so-called $CO_2$ injection pump, there are cases in which defects occur in the sealing gaps 76 that are caused between the rotation rings 72 and the stationary rings 74. Here, FIG. 14 is a graph showing the relationship between the enthalpy of $CO_2$ and the pressure of $CO_2$ in the dry gas seal structure 70 of the related art. In a case in which the dry gas seal structure 70 is applied to a $CO_2$ injection pump, the $CO_2$ housed in the housing 73 remains in, for example, a supercritical state in which the pressure is 20 MPa, and the temperature is 30° C. or higher. In such a supercritical state, in a case in which the rotary shaft 71 is yet to be driven, and the temperature of $CO_2$ in the housing 73 is still low, for example, a case in which the temperature of $CO_2$ is 50° C. as shown in FIG. 14, the $CO_2$ is depressurized when passing through the sealing gaps 76 so that the state changes from the supercritical state, and turns into a gas-liquid two-phase state, that is, a state in which gas and liquid are mixed. Then, the properties of $CO_2$, specifically, the density or viscosity abruptly change. In a case in which rotary starts driving in such a state, there are cases in which the behaviors of the stationary rings 74 pressed due to the coil springs 75 are not stabilized. Furthermore, the "supercritical state" in the invention refers to a point having a critical temperature or pressure at which gas and liquid can coexist, that is, a state at which the critical point is exceeded.

In addition, in a case in which the rotary shaft 71 is yet to be driven, and the temperature of $CO_2$ in the housing 73 is still low, for example, a case in which the temperature of $CO_2$ is 40° C. as shown in FIG. 7, $CO_2$ in the supercritical state has a higher viscosity than $CO_2$ in a gaseous state. In a case in which rotary starts driving in such a state, the amount of viscous heat generation increases when $CO_2$ passes through the sealing gaps 76, and there are cases in which excessive thermal deformation occurs at the rotation rings 72 and the stationary rings 74.

Furthermore, in a case in which the rotary shaft 71 is yet to be driven, and the temperature of $CO_2$ in the housing 73 is still low, $CO_2$ is adiabatically expanded when passing through the sealing gaps 76 such that the temperature of $CO_2$ falls below the freezing point at the outlet portions of the sealing gaps 76. In this case, there are cases in which moisture in the atmosphere is frozen in the vicinities of the outlet portions of the sealing gaps 76.

SUMMARY OF THE INVENTION

The invention has been made in consideration of the above circumstances, and an object of the invention is to provide a dry gas seal structure in which defects do not occur at sealing gaps when the rotary shaft starts driving even in a case in which the dry gas seal structure is applied to a rotating machine having a fluid in the supercritical state housed inside the housing.

Means for Solving the Problem

A first aspect of the dry gas seal structure according to the invention has a housing that houses a fluid in a supercritical state, a rotary shaft that is provided so as to penetrate the housing and is rotary-driven, rotation rings that are provided around the rotary shaft and rotate integrally with the rotary shaft, stationary rings that are provided in the housing, the stationary rings contacting with the rotation rings throughout the circumferences when the rotary shaft is stopped and stationary positioned in a state in which sealing gaps are formed between the rotation rings and the stationary rings when the rotary shaft rotates, a pipe path that supplies a portion of the fluid housed in the housing to inlet portions of the sealing gaps, a temperature-adjusting device that adjusts the temperature of the fluid flowing through the pipe path, and a control unit that controls operation of the temperature-adjusting device so as to heat the inlet portions of the sealing gaps to a predetermined temperature before the rotary shaft is driven.

According to the above configuration, the fluid in the supercritical state, which has been heated using the temperature-adjusting device, is supplied before starting driving the rotary shaft so that the inlet portions between the sealing gaps are heated to a predetermined temperature in advance.

In the first aspect of the dry gas seal structure according to the invention, a circulating pump is provided in the pipe path to resupply the fluid to the inlet portions of the sealing gaps by circulating the fluid supplied to the inlet portions of the sealing gaps.

According to the above configuration, since a portion of the fluid housed in the housing is circulated and repeatedly supplied to the inlet portions of the sealing gaps, it is not necessary to heat the entire fluid housed in the housing. Therefore, a time, which is necessary to control the temperature of the fluid using the temperature-adjusting device, can be shortened, and, additionally, the capacity of a heater that composes the temperature-adjusting device can be decreased.

In addition, in the first aspect of the dry gas seal structure according to the invention, the temperature-adjusting device may have a heater that heats the fluid flowing through the pipe path, and the heat source of the heater may be the circulating pump or a lubricating oil pump, the lubricating oil pump supplying a lubricant to a bearing, which rotatably supports the rotary shaft.

According to the above configuration, since it is not necessary to provide an exclusive heat source for heating the fluid, cost reduction can be achieved.

A second aspect of the dry gas seal structure according to the invention has a housing that houses a fluid in a supercritical state, a rotary shaft that is provided so as to penetrate the housing and is rotary-driven, rotation rings that are provided around the rotary shaft and rotate integrally with the rotary shaft, stationary rings that are provided in the housing, the stationary rings contacting with the rotation rings throughout the circumferences when the rotary shaft is stopped and stationary positioned in a state in which sealing gaps are formed between the rotation rings and the stationary rings when the rotary shaft rotates, a heater that is provided in at least any one of the rotation rings and the stationary rings, and a control unit that controls operation of the temperature-adjusting device so as to heat inlet portions of the sealing gaps to a predetermined temperature before the rotary shaft is driven.

According to the above configuration, the inlet portions of the sealing gaps are heated to a predetermined temperature in advance using a heater provided in the rotation rings or the stationary rings before starting driving the rotary shaft. In addition, since it is not necessary to install a temperature-adjusting device or the like for adjusting the temperature of the fluid outside the housing, space-saving can be achieved in an entire rotating machine.

A third aspect of the dry gas seal structure according to the invention has a housing that houses a fluid in a supercritical state, a rotary shaft that is provided so as to penetrate the housing and is rotary-driven, rotation rings that are provided around the rotary shaft and rotate integrally with the rotary shaft, stationary rings that are provided in the housing, the stationary rings contacting with the rotation rings throughout the circumferences when the rotary shaft is stopped and stationary positioned in a state in which sealing gaps are formed between the rotation rings and the stationary rings when the rotary shaft rotates, a heater that is provided at locations immediately upstream of the sealing gaps in the housing, and a control unit that controls operation of the temperature-adjusting device so as to heat inlet portions of the sealing gaps to a predetermined temperature before the rotary shaft is driven.

According to the above configuration, the inlet portions between the sealing gaps are heated to a predetermined temperature in advance using a heater provided in the housing before the rotary shaft starting driving. In addition, since it is not necessary to install a temperature-adjusting device or the like for adjusting the temperature of the fluid outside the housing, space-saving can be achieved in an entire rotating machine.

In addition, in the first to third aspects of the dry gas seal structure according to the invention, a circulating path which is formed inside the housing and in which the fluid in the supercritical state flows is formed in such a way that portions immediately upstream of the sealing gaps are narrower than other portions.

According to the above configuration, once the rotary shaft starts driving, the inlet portions of the sealing gaps are heated due to agitation loss caused when the fluid passes the narrow portions of the circulating path. Therefore, once the rotary shaft starts driving, it is possible to stop the temperature-adjusting device or the heater that is used for heating the inlet portions of the sealing gaps before the rotary shaft starting driving. Therefore, costs can be reduced as much as the running costs of the temperature-adjusting device or the heater which become unnecessary.

Advantageous Effects of Invention

According to the dry gas seal structure of the invention, since the inlet portions of the sealing gaps are heated in advance before the rotary shaft starting driving, the temperature of the fluid in the supercritical state which passes through the sealing gaps increases when the rotary shaft starts driving. Therefore, the fluid in the supercritical state changes from the supercritical state to a gaseous state if it is decompressed when the fluid passes through the sealing gaps. Thereby, a state in which the behaviors of the stationary rings are stabilized is maintained without abruptly changing the properties of the fluid.

In addition, since the temperature of the fluid that passes through the sealing gaps when the rotary shaft starts driving increases, the viscosity of the fluid lowers. Thereby, the amount of viscous heat generation caused when the fluid passes through the sealing gaps decreases, and there is no case in which thermal deformation occurs in the stationary rings and the like.

Furthermore, since the temperature of the fluid, which passes through the sealing gaps when the rotary shaft starts driving, increases, it is possible to prevent the temperature of the fluid at the outlet portions of the sealing gaps from becoming below the freezing point even though the fluid is adiabatically expanded while passing the sealing gaps. Thereby, there is no case in which moisture in the atmosphere is frozen in the vicinities of the outlet portions of the sealing gaps.

DETAILED DESCRIPTION OF THE INVENTION

Figure 1:
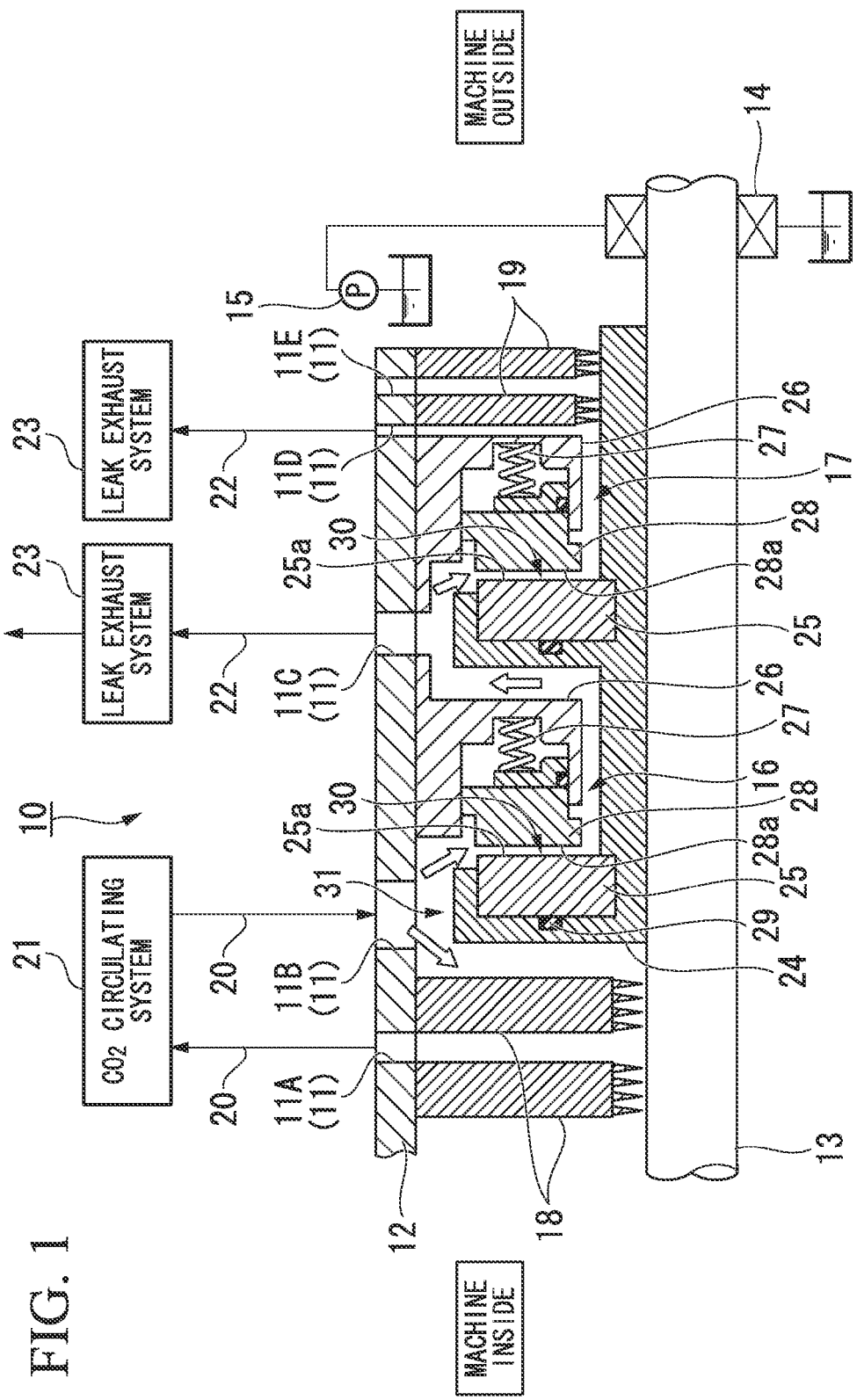
FIG. 1 is a schematic vertical cross-sectional view showing a dry gas seal structure according to a first aspect of the invention.

Hereinafter, embodiments of the invention will be described with reference to the accompanying drawings. Firstly, the configuration of a dry gas seal structure of a first embodiment of the invention will be described. FIG. 1 is a schematic vertical cross-sectional view showing a dry gas seal structure 10 of the present embodiment. The dry gas seal structure 10 has a housing 12, a rotary shaft 13, a bearing 14, a lubricating oil pump 15, a first seal structure 16, a second seal structure 17, inside labyrinths 18, outside labyrinths 19, a $CO_2$ circulating system 21, and leak exhaust systems 23.

A plurality of channels 11 is formed in the housing 12. The rotary shaft 13 is provided so as to penetrate the housing 12, rotatably supported by the bearing 14, and rotary-driven. The lubricating oil pump 15 supplies a lubricant to the bearing 14. The first seal structure 16 and the second seal structure 17 are provided along the rotary shaft 13. Two inside labyrinths 18 are provided on the inside of the first seal structure 16 in the housing 12, and two outside labyrinths 19 are provided on the outside of the second seal structure 17 in the housing 12. The $CO_2$ circulating system 21 is connected to the housing 12 inside of the first seal structure 16 through circulating pipe paths 20, and the leak exhaust systems 23 are connected to the housing 12 outside of the first seal structure 16 through exhaust pipe paths 22.

The housing 12 composes a wall surface of the $CO_2$ injection pump. $CO_2$ (carbon dioxide) in a supercritical state is housed inside the housing 12. In addition, in the housing 12, a first channel 11A is formed between the two inside labyrinths 18, a second channel 11B is formed at a location on the inside of the first seal structure 16, and a third channel 11C is formed at a location on the outside of the first seal structure 16.

As shown in FIG. 1, the first seal structure 16 has the rotation ring 25, the coil spring 27, the stationary ring 28, and O rings 29. The rotation ring 25 is fixed to a shaft sleeve 24 that rotates integrally with the rotary shaft 13. The coil spring 27 is attached to a retainer 26 that is fixed to the housing 12 at one end. The stationary ring 28 is engaged with a groove that is formed in the retainer 26, to which the other end of the coil spring 27 is attached. The O rings 29 are provided at places to seal a location of the rotation ring 25 being attached to the shaft sleeve 24 and a location of the stationary ring 28 being attached to the retainer 26. In addition, while FIG. 1 does not show details, a spiral groove is formed on a seal surface 25a of the rotation ring 25, that is, a surface facing the stationary ring 28. Furthermore, a spiral groove may be formed on a seal surface 28a of the stationary ring 28, that is, a surface facing the rotation ring 25.

According to the first seal structure 16 configured as above, when rotation of the rotary shaft 13 is stop, the seal surface 28a of the stationary ring 28 comes into close contact with the seal surface 25a of the rotation ring 25 due to a spring force of the coil spring 27. Thereby, the first seal structure 16 seals the gap between the rotary shaft 13 and the housing 12 so that the $CO_2$ in the machine does not leak to the outside of the machine. On the other hand, when the rotary shaft 13 starts to rotate, the $CO_2$ in the machine is introduced into the inside of the spiral groove (not shown) that is formed on the seal surface 25a of the rotation ring 25, and a small sealing gap 30 occurs between the rotation ring 25 and the stationary ring 28 due to the resulting dynamic pressure effect. In addition, only a small amount of the $CO_2$ in the machine passes through the sealing gap 30 and a circulating path 31 that is formed between the retainer 26 and the shaft sleeve 24 so as to be leaked toward the leak exhaust system 23 from the third channel 11C. As such, only a small amount of $CO_2$ in the machine leaks outside so that the first seal structure 16 seals a gap between the rotary shaft 13 and the housing 12 so that the remaining majority of $CO_2$ does not leak to the outside of the machine.

The second seal structure 17 prevents the small amount of $CO_2$ that has passed through the sealing gap 30 of the first seal structure 16 as described above from leaking to the outside of the machine except the leak exhaust system 23. Since the second seal structure 17 has the same configuration as the first seal structure 16, the same reference signs as for the first seal structure 16 will be used, and description thereof is omitted herein. According to the second seal structure 17 configured as above, in the small amount of the $CO_2$ that has passed through the sealing gap 30 of the first seal structure 16, a portion of the small amount of the $CO_2$ is passing through the sealing gap 30 of the second seal structure 17, and thereby the remaining majority of the small amount of the $CO_2$ is prevented from leaking to the outside of the machine. In addition, a majority of the small amount of $CO_2$ that has passed through the first seal structure 16 is exhausted to the outside of the machine through the third channel 11C. In addition, when the first seal structure 16 loses the sealing function due to damage or the like, the second seal structure 17 replaces the sealing function of the first sealing structure 16 as a backup. Furthermore, the embodiment has a so-called tandem structure that is provided with the second seal structure 17 in addition to the first seal structure 16, but the second seal structure 17 is not an essential configuration of the invention, and the configuration may include only the first seal structure 16.

The inside labyrinth 18 and the outside labyrinth 19 are a so-called labyrinth seal that is used for a compressed gas sealing. As shown in FIG. 1, the inside labyrinth 18 and the outside labyrinth 19 alternately form narrow portions and wide portions between the rotary shaft 13 and the housing 12. According to the above configuration, the $CO_2$ in the machine passes through the narrow portion, and then expands at the wide portion so that the $CO_2$ pressure results in a reduction of pressure, and repetition of the above process gradually reduces leaking gas. In addition, the leak exhaust system 23 is also connected to a fourth channel 11D that is provided between the second seal structure 17 and the outside labyrinth 19 through the exhaust pipe path 22. Furthermore, while the inside labyrinth 18 and the outside labyrinth 19 are not essential configurations of the invention, installation of them on the inside of the first seal structure 16 and the outside of the second seal structure 17 as in the embodiment leads to the following advantages. Since the volume of $CO_2$ that circulates in the circulating system 21 through the first channel 11A by the inside labyrinth 18 is smaller than the volume of the $CO_2$ in the machine, the capacity of a heater, which will be described below, can be reduced, and a time for controlling the temperature can be shortened. In addition, a fifth channel 11E between the outside labyrinths 19 supplies nitrogen or air gas so that the lubricant of the bearing can be prevented from intruding into the machine. Needless to say, the numbers, installation locations, and the like of the inside labyrinths 18 and the outside labyrinths 19 can be appropriately changed.

The $CO_2$ circulating system 21 circulates the $CO_2$ in the machine so as to repeatedly supply the $CO_2$ in the machine to the sealing gap 30 caused between the rotation ring 25 and the stationary ring 28.

Figure 2:
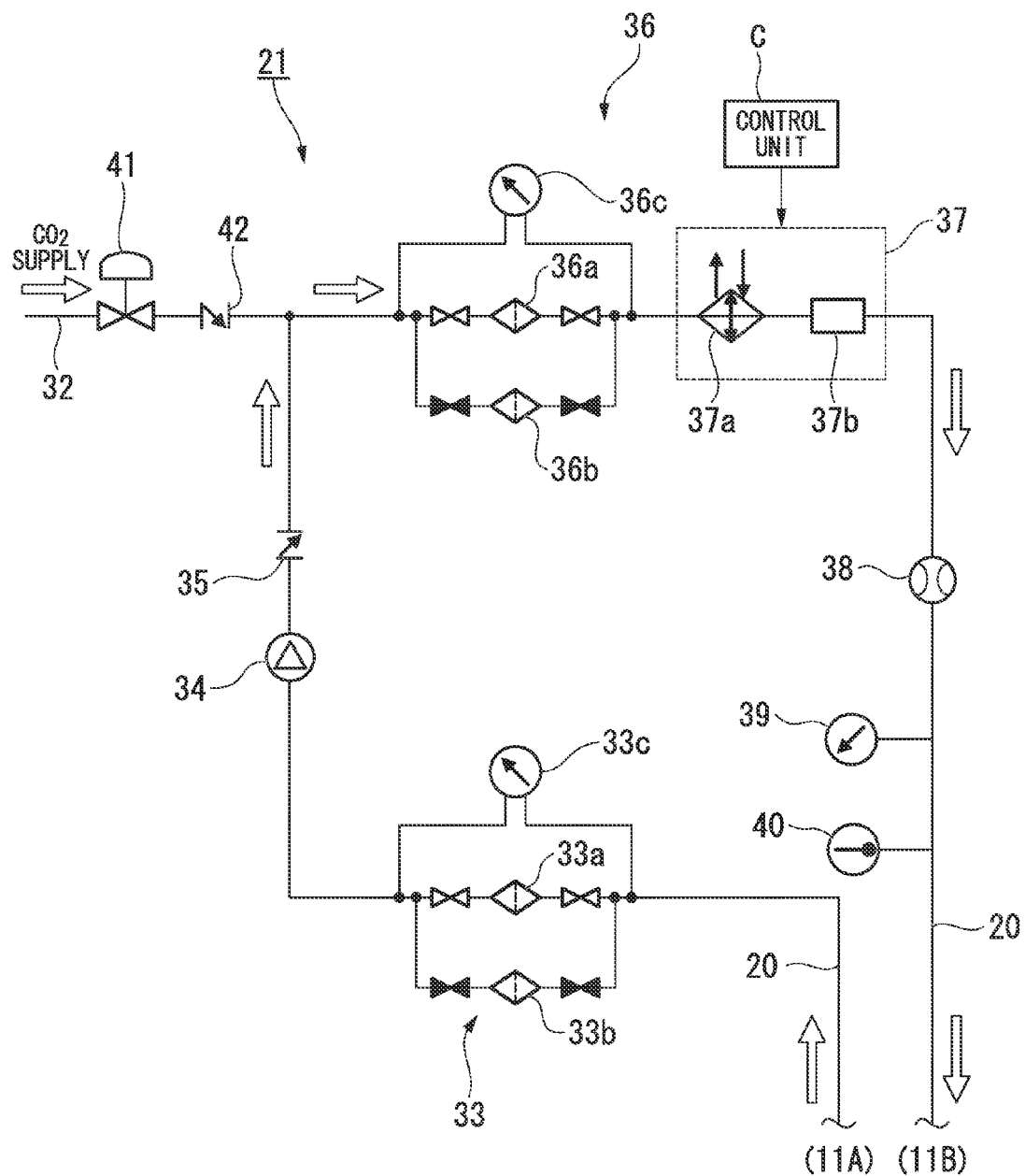
FIG. 2 is a schematic view showing the configuration of a $CO_2$ circulating system.

Here, FIG. 2 is an explanatory view showing the configuration of the $CO_2$ circulating system 21. In the $CO_2$ circulating system 21, one end of a supply pipe path 32 that extends from the inside is connected to a circulating pipe path 20 having one end connected to the first channel 11A of the housing 12 and the other end connected to the second channel 11B at a predetermined place as shown in FIG. 1, and a variety of configuration elements are installed at locations in the circulating pipe path 20 and the supply pipe path 32.

As shown in FIG. 2, in the circulating pipe path 20, a first filter unit 33, a circulating pump 34, a check valve 35, a second filter unit 36, a temperature-adjusting device 37, a flow meter 38, a pressure meter 39, and a thermometer 40 are installed sequentially in the $CO_2$ circulating direction which is shown by arrows in the drawing from the connection place to the first channel 11A to the connection place of the second channel 11B.

The first filter unit 33 has a filter 33a that is installed in the circulating pipe path 20 so as to remove foreign substances and the like from $CO_2$, a backup filter 33b that functions in a case in which the filter 33a is clogged or the like, and a pressure difference meter 33c that measures the pressure difference between the upper stream side location and the downstream side location with disposing the filter 33a therebetween. In addition, the second filter unit 36 also has a filter 36a, a backup filter 36b, and a pressure difference meter 36c, and the respective configurations have the same functions as the respective configurations of the first filter unit 33.

The circulating pump 34 forcibly circulates $CO_2$ along the circulating pipe path 20. In addition, the check valve 35 has functions of maintaining the flow of $CO_2$ in the circulating pipe path 20 constant at all times and preventing reflux.

The temperature-adjusting device 37 adjusts the temperature of $CO_2$ that flows in the circulating pipe path 20. As shown in FIG. 2, the temperature-adjusting device 37 has a heat exchanger 37a that exchanges heat with cooling water so as to lower the temperature of $CO_2$, and a heater 37b that heats $CO_2$ so as to increase the temperature of $CO_2$. In addition, operations of the temperature-adjusting device 37 are controlled using a control unit C. Furthermore, while details are not shown in FIG. 2, the control unit C controls not only operations of the temperature-adjusting device 37 but also operations of the portions that compose the dry gas seal structure 10. Furthermore, the heater 37b may use a configuration element that is provided in the dry gas seal structure 10 for separate use as a heat source. Specifically, circulating pump loss caused in the circulating pump 34 or lubricating oil pump loss caused in the lubricating oil pump 15 as shown in FIG. 1 is converted to heat energy, and the heat energy may be used as the heat source of the heater 37b. In addition, a variety of pumps that are installed in the dry gas seal structure 10 for other uses can also be used as the heat source of the heater 37b as well as the circulating pump 34 and the lubricating oil pump 15. According to the above configuration, since an exclusive heat source is not required, and thus the corresponding running costs are also not required, there is an advantage in that costs can be reduced compared to a case in which an exclusive heater 37b is provided. In addition, the heat exchanger 37a is not essential for the configuration of the temperature-adjusting device 37, and the temperature-adjusting device 37 needs to have at least the heater 37b.

The flow meter 38 measures the flow amount of $CO_2$ that circulates the circulating pipe path 20. In addition, the pressure meter 39 measures the pressure of $CO_2$ in the vicinity of the place at which the $CO_2$ circulating system 21 is connected to the second channel 11B. In addition, the thermometer 40 measures the temperature of $CO_2$ in the vicinity of a location at which the $CO_2$ circulating system 21 is connected to the second channel 11B.

In addition, as shown in FIG. 2, a pressure adjusting valve 41 and a check valve 42 are installed in the supply pipe path 32 sequentially in the $CO_2$ circulating direction. The pressure adjusting valve 41 is a valve that can arbitrarily adjust the supply pressure of $CO_2$ by adjusting the degree of opening and closing of the supply pipe path 32. In addition, the check valve 42 is a valve that has a function of maintaining the flow of $CO_2$ in the supply pipe path 32 in a constant direction at all times so as to prevent reflux, and inhibits the influx of $CO_2$ that circulates in the circulating pipe path 20 into the supply pipe path 32.

Figure 3:
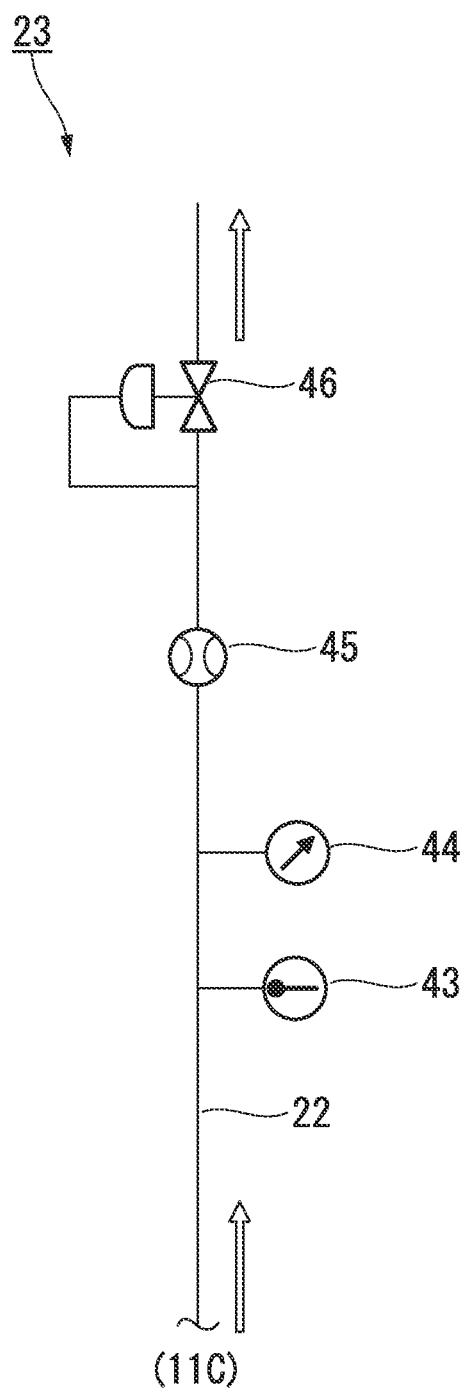
FIG. 3 is a schematic view showing the configuration of a leak exhaust system.

The leak exhaust system 23 is to exhaust the small amount of $CO_2$ that has passed through the sealing gap 30 in the first seal structure 16 outside of the machine. Here, FIG. 3 is a schematic view showing the configuration of the leak exhaust system 23. The leak exhaust system 23 is formed by drawing the exhaust pipe path 22 that is connected to the third channel 11C of the housing 12, which is shown in FIG. 1, at one end outside of the machine, and has a variety of configuration elements installed at locations in the exhaust pipe path 22.

In the exhaust pipe path 22, as shown in FIG. 3, a thermometer 43, a pressure meter 44, a flow meter 45, and a back pressure valve 46 are installed sequentially along the $CO_2$ circulating direction from the third channel 11C.

The thermometer 43 measures the temperature of $CO_2$ in the vicinity of a place at which the $CO_2$ circulating system 21 is connected to the third channel 11C shown in FIG. 1. In addition, the pressure meter 44 measures the pressure of $CO_2$ in the vicinity of the place at which the $CO_2$ circulating system 21 is connected to the third channel 11C. In addition, the flow meter 45 measures the flow amount of $CO_2$ that flows in the exhaust pipe path 22. In addition, the back pressure valve 46 is a valve that maintains the pressure of $CO_2$ on the upper stream side of the back pressure valve constant. That is, when the pressure on the upper stream side becomes a set value or more, the back pressure valve 46 makes $CO_2$ flow and thus lowers the pressure, thereby maintaining the pressure on the upper stream side constant.

Figure 4:
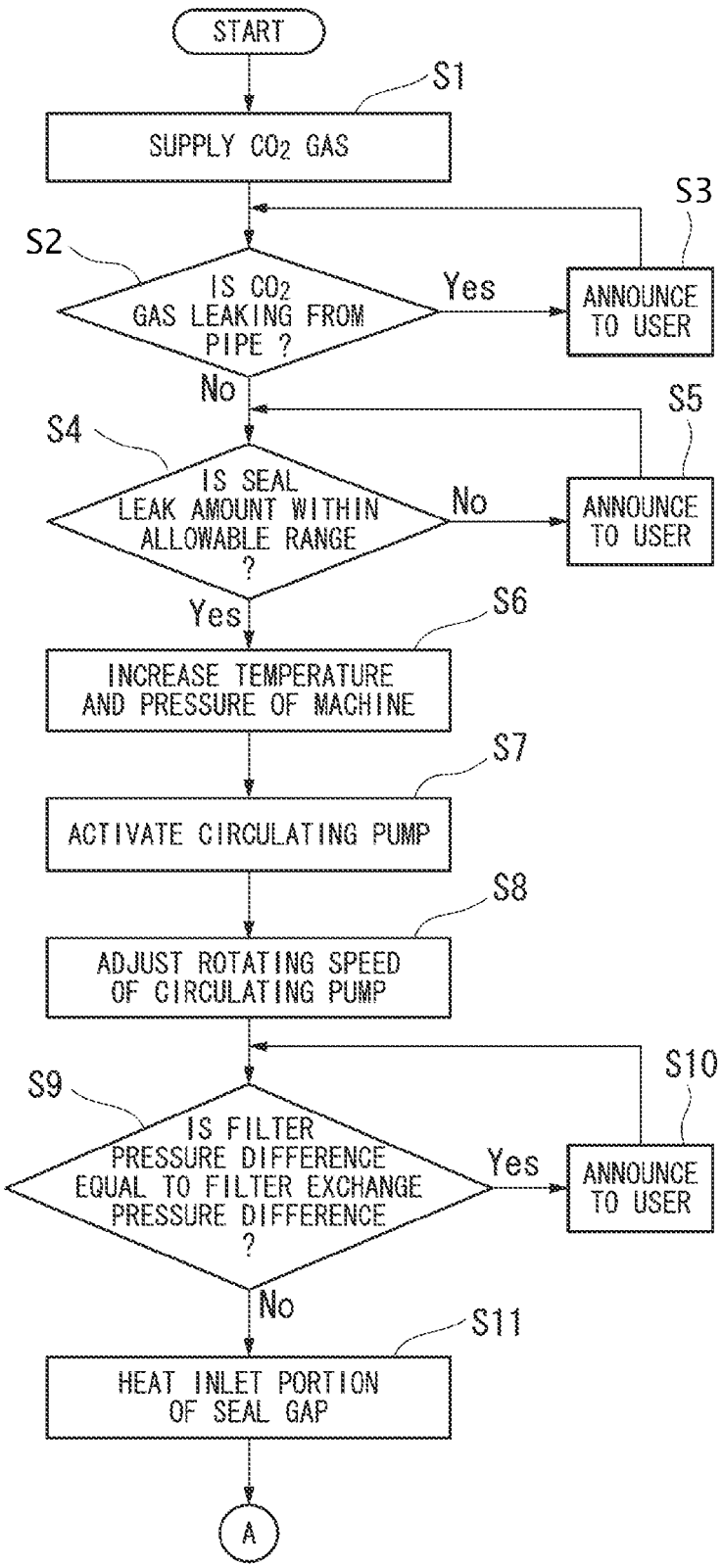
FIG. 4 is a flow chart showing the flow of an activation treatment of a $CO_2$ injection pump having the dry gas seal structure according to the first aspect of the invention.
Figure 5:
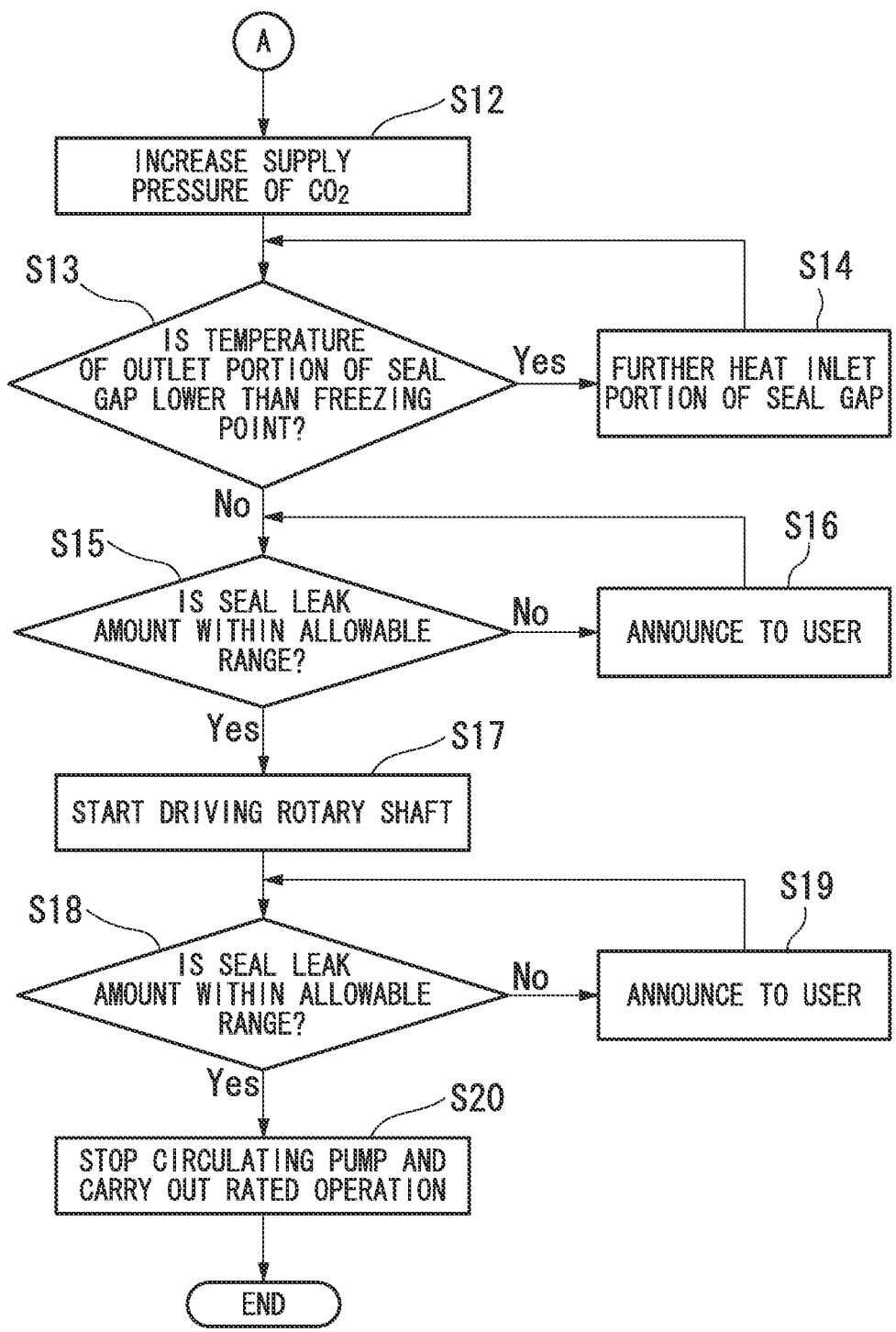
FIG. 5 is a flow chart showing the flow of an activation treatment of a $CO_2$ injection pump having the dry gas seal structure according to the first aspect of the invention.

Next, a procedure when a $CO_2$ injection pump employing the dry gas seal structure 10 according to the first embodiment is activated will be described. FIGS. 4 and 5 are flow charts showing the flow of a treatment carried out by the control unit C included in the $CO_2$ injection pump.

In a case in which the $CO_2$ injection pump is activated, firstly, the control unit C supplies $CO_2$ to the supply pipe path 32 in a gaseous state (S1). In addition, the control unit determines whether or not the $CO_2$ gas leaks from locations in the pipe, specifically, the circulating pipe path 20, the supply pipe path 32, and the exhaust pipe path 22 (S2). As a result, in a case in which the occurrence of the $CO_2$ gas leaking is determined (S2: Yes), the control unit announces to the user of such a fact (S3), and waits until the $CO_2$ gas leaking is stopped. The user, who received the announcement, for example, applies soapy water to joint portions of the pipes so as to determine whether or not bubbles are generated, thereby determining whether the $CO_2$ gas leaks or not. Furthermore, while not shown in the drawing, the specific way of announcing to the user includes a method in which an alarm is shown in the display screen and a method in which a warning alarm sounds from a speaker.

On the other hand, in a case in which the control unit C determines that the $CO_2$ gas is not leaking (S2: No), subsequently, the control unit C determines whether or not the seal leak amount is within the allowable range (S4). That is, the control unit C detects the measurement value of the flow meter 45 that is installed in the exhaust pipe path 22 shown in FIG. 3, thereby detecting the seal leak amount, that is, the amount of $CO_2$ leaked from the sealing gap 30 in the first seal structure 16. In addition, whether or not the detected seal leak amount is within an allowed range in terms of the seal leak amount in a state in which the rotation of the rotary shaft 13 is stopped. As a result, in a case in which the seal leak amount is determined to be not within the allowable range (S4: No), the control unit C announces to the user of that fact (S5), and waits until the seal leak amount falls within the allowable range. In this case, since there is a possibility of $CO_2$ leaking from the stationary ring 28, the rotation ring 25, or the like, the user, who received the announcement, checks the stationary ring, the rotation ring, or the like, and, in a case in which defects are found, an appropriate treatment, such as repair or replacement, is carried out. On the other hand, in a case in which the seal leak amount is determined to be within the allowable range (S4: Yes), the control unit C moves to the following step.

Next, the control unit C increases the temperature and pressure of the machine until the circulating pump 34 that is installed in the circulating pipe path 20 shown in FIG. 2 becomes ready for activation, specifically, until the $CO_2$ gas in the machine is in the supercritical state (S6). Subsequently, the control unit C activates the circulating pump 34 (S7). Furthermore, the control unit C detects the measured value of the flow meter 38 that is installed in the circulating pipe path 20 shown in FIG. 2, and appropriately adjusts the rotating speed of the circulating pump 34 so that the flow amount of the $CO_2$ that circulates in the circulating pipe path 20 becomes a predetermined flow amount (S8). As such, by setting the flow amount of the $CO_2$ to be the predetermined flow amount or more, a sufficient amount of the $CO_2$ that flows into the second channel 11B from the circulating pipe path 20 flows toward the inlet of the sealing gap 30 in the first seal structure 16 and toward the inside labyrinth 18, and therefore the inlet portion of the sealing gap 30 can be sufficiently heated as described below, and it is possible to prevent foreign substances or the like from intruding from the side of the inside labyrinth 18 toward the first seal structure 16.

Next, the control unit C detects the measurement values of the respective pressure difference meters 33c and 36c in the first filter unit 33 and the second filter unit 36 which are installed in the circulating pipe path 20 shown in FIG. 2 so as to detect filter pressure differences, that is, pressure differences on the upper stream side and the downstream side of the filters 33a and 36a respectively. In addition, whether or not the detected filter pressure differences reach the predefined filter exchange pressure difference (S9). As a result, in a case in which the filter pressure differences are determined to reach the filter exchange pressure difference (S9: Yes), the control unit C announces to the user of the necessity of exchanging the filters 33a by displaying that fact on the display screen, not shown (S10), and waits until the filter pressure differences fall below the filter exchange pressure difference. The user, who received the announcement, then carries out an appropriate treatment, such as substituting into the backup filters 33b and 36b or exchanging the filters 33a and 36a with new filters.

On the other hand, in a case in which the control unit C determines that the filter pressure difference does not yet reach the filter exchange pressure difference (S9: No), subsequently, the inlet portion of the sealing gap 30 in the first seal structure 16 is heated to a predetermined temperature (S11). That is, the control unit C controls operations of the heat exchanger 37a or the heater 37b which compose the temperature-adjusting device 37 shown in FIG. 2 so that the inlet portion of the sealing gap 30 in the first seal structure 16 is heated by the $CO_2$ flowing in from the second channel 11B so as to reach a predetermined temperature. Furthermore, in the invention, the "inlet portion of the sealing gap 30" refers to the vicinity of the most upper stream portion of the sealing gap 30 in the circulating direction of the $CO_2$, and includes the rotation ring 25, the stationary ring 28, the shaft sleeve 24, the retainer 26, or the housing 12.

Figure 6:
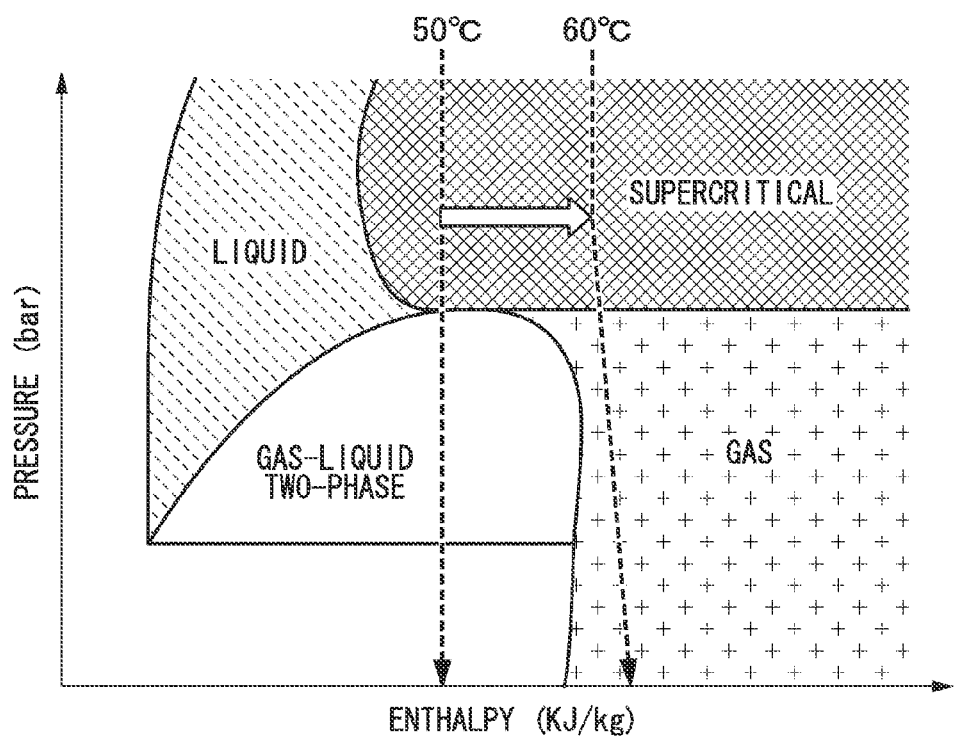
FIG. 6 is an explanatory view for explaining the actions and effects of heating of sealing gaps before a rotary shaft starts driving, and a graph indicating the enthalpy of $CO_2$ along the horizontal axis and the pressure of $CO_2$ along the vertical axis.
Figure 7:
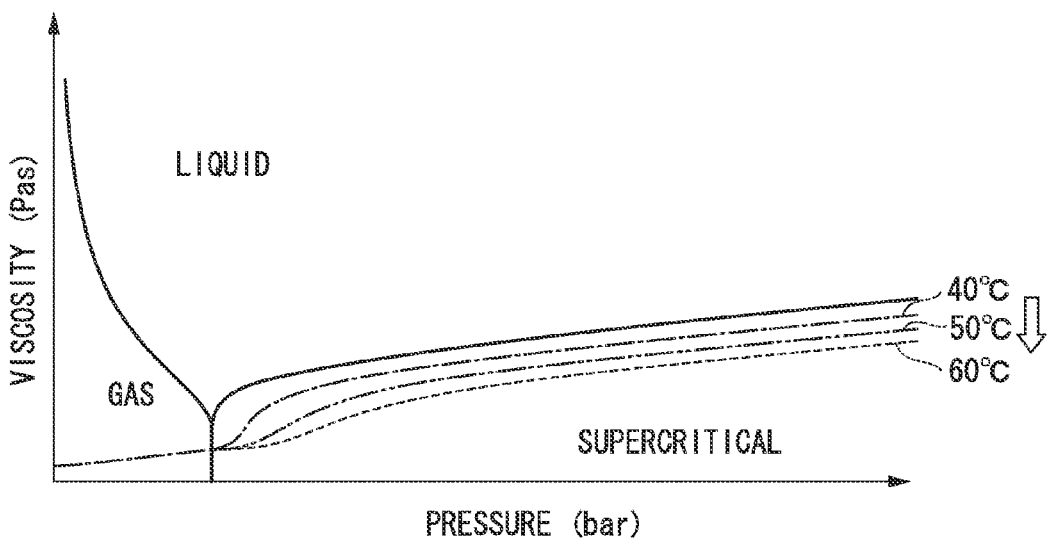
FIG. 7 is an explanatory view for explaining the actions and effects of heating of sealing gaps before a rotary shaft starts driving, and a graph indicating the pressure of $CO_2$ along the horizontal axis and the viscosity of $CO_2$ along the vertical axis.

Here, FIGS. 6 and 7 are explanatory views for explaining the effects of heating of the inlet portion of the sealing gaps 30. When the inlet portion of the sealing gap 30 is heated, the temperature of the $CO_2$ increases as the $CO_2$ passes through the sealing gap 30. In addition, as shown in FIG. 6, when the temperature of the $CO_2$ increases to, for example, 50° C. to 60° C., and the pressure of the $CO_2$ is decreased as the $CO_2$ passes through the sealing gap 30, the state of the $CO_2$ changes from the supercritical state to a gas state. Therefore, the properties of the $CO_2$ do not change abruptly compared to a case in which the state of the $CO_2$ changes from the supercritical state to a gas-liquid double-phase state as described above. Therefore, the behaviors of the stationary ring 28 maintain a stable state. Furthermore, as shown in FIG. 7, when the temperature of the $CO_2$ increases to, for example, 40° C. to 60° C., the viscosity of the $CO_2$ lowers. Thereby, the amount of viscous heat generation decreases as the $CO_2$ passes through the sealing gap 30, and thermal deformation does not occur in the rotation ring 25 and the stationary ring 28.

Next, the control unit C increases the supply pressure of the $CO_2$ to a predetermined pressure (S12). That is, the control unit C controls operations of the pressure adjusting valve 41 that is installed in the supply pipe path 32 shown in FIG. 2 so as to increase the supply pressure of the $CO_2$. In addition, together with the above control, the control unit C controls operation of the back pressure value 46 that is installed in the exhaust pipe path 22 so as to adjust the pressure of the $CO_2$ in the outlet portion of the sealing gap 30 in the first seal structure 16 so that the $CO_2$ in the inlet portion of the sealing gap 30 in the second seal structure 17 becomes a predetermined pressure.

After that, the control unit C determines whether or not the temperature of the outlet portion of the sealing gap 30 in the first seal structure 16 falls below the freezing point (S13). That is, the control unit C detects the measurement value of the thermometer 43 that is installed in the exhaust pipe path 22 shown in FIG. 3 so as to detect the temperature of the outlet portion of the sealing gap 30 in the first seal structure 16. In addition, in a case in which the detected temperature is below the freezing point (S13: Yes), the control unit C further heats the inlet portion of the sealing gap 30 (S14). That is, the control unit C controls operations of the temperature-adjusting device 37 shown in FIG. 2 so that the inlet portion of the sealing gap 30 in the first seal structure 16 is heated by the $CO_2$ flowing in from the second channel 11B so that the temperature further increases.

As such, moisture in the atmosphere does not freeze at the outlet portion of the sealing gap 30 as long as the temperature of the inlet portion of the sealing gap 30 in the first seal structure 16 is prevented from falling below the freezing point. Furthermore, in a case in which the temperature of the $CO_2$ cannot be further increased due to the performance of the temperature-adjusting device 37, while details are not shown in the drawing, the outlet portion of the sealing gap 30 may be prevented from falling below the freezing point by blowing heated gas to the outlet portion of the sealing gap 30 in the first seal structure 16.

Next, the control unit C, again, determines whether or not the seal leak amount is within the allowable range (S15). That is, the control unit C detects the measurement value of the flow meter 45 that is installed in the exhaust pipe path 22 shown in FIG. 3 so as to detect the seal leak amount, that is, the amount of the $CO_2$ leaked out from the sealing gap 30 in the first seal structure 16. In addition, whether or not the detected seal leak amount is within the allowed range in terms of the seal leak amount in a state in which the rotation of the rotary shaft 13 is stopped. As a result, in a case in which the seal leak amount is determined to be not within the allowable range (S15: No), the control unit C announces to the user of that fact (S16), and waits until the seal leak amount falls within the allowable range. The user, who received the announcement, carries out an appropriate treatment so that the seal leak amount falls within the allowable range.

Here, in a case in which the seal leak amount is determined to be outside the allowable range, particularly, a case in which the seal leak amount is zero, the user confirms whether or not the air volume of the $CO_2$ is present at the outlet portion of the sealing gap 30 as the appropriate treatment. As a result, in a case in which the air volume of the $CO_2$ is not present at the outlet portion, there is a possibility of the $CO_2$ leaking to the outside of the machine through separate places from the sealing gap 30, for example, places damaged by the O ring 29. In this case, the user finds the places of leaking and then carries out a treatment, such as repair. Meanwhile, in a case in which places other than the sealing gap 30 at which the $CO_2$ leaks to the outside of the machine cannot be found, the user stops the supply of the $CO_2$, and confirmed whether or not the pressure in the machine decreases. As a result, in a case in which the pressure in the machine does not decrease, since there is a possibility of the sealing gap 30 being closed, the user carries out a measure, such as hand turning. In addition, the user confirms whether or not malfunction occurs in a variety of sensors as another measure. In addition, in a case in which the seal leak amount is determined to be outside the allowable range, particularly, a case in which the seal leak amount is excessive, the user inspects the rotation ring 25 or the stationary ring 28, and then carries out a measure, such as repair or replacement.

On the other hand, in a case in which the seal leak amount is determined to be within the allowable range (S15: Yes), the control unit C activates a motor, not shown, so as to start rotation of the rotary shaft 13 and increase the rotary speed to a predetermined speed (S17). At this time, the control unit C rapidly accelerates the rotary shaft 13 until the rotary shaft reaches the predefined lowest rotating speed or more. In addition, the temperature of the sealing gap 30 increases due to the agitation loss, viscous heat generation, or the like of the $CO_2$ in the sealing gap 30 as the rotating speed of the rotary shaft 13 increases. Therefore, the control unit C appropriately controls operations of the temperature-adjusting device 37 shown in FIG. 2 so that the temperature of the inlet portion of the sealing gap 30 can be maintained at an appropriate temperature with no regard to the degree of temperature increase. In addition, the control unit C stops operations of the heater 37b that composes the temperature-adjusting device 37 at a step in which, finally, the temperature of the sealing gap 30 sufficiently increases due to agitation loss, viscous heat generation, or the like. Furthermore, the control unit C measures the shaft vibrations of the rotary shaft 13 as the rotary shaft 13 starts driving, and adjusts the balance of the rotary shaft system by stopping the rotation of the rotary shaft 13 in a case in which the measured shaft vibrations exceed the predefined alarm value of the seal allowable value so that the shaft vibrations fall within the seal allowable value.

Next, the control unit C, again, determines whether or not the seal leak amount is within the allowable range (S18). That is, the control unit C detects the measurement value of the flow meter 45 that is installed in the exhaust pipe path 22 shown in FIG. 3 so as to detect the seal leak amount, that is, the amount of the $CO_2$ leaked out from the sealing gap 30 of the first seal structure 16. In addition, the control unit determines whether or not the detected seal leak amount is within an allowed range in terms of the seal leak amount in a state in which the rotary shaft 13 is rotating. As a result, in a case in which the seal leak amount is determined to be not within the allowable range (S18: No), the control unit C announces to the user of that fact (S19), and waits until the seal leak amount falls within the allowable range. The user, who received the announcement, carries out an appropriate treatment so that the seal leak amount falls within the allowable range.

Here, in a case in which the seal leak amount is determined to be outside the allowable range, particularly, a case in which the seal leak amount is zero, the user confirms whether or not the air volume of the $CO_2$ is present at the outlet portion of the sealing gap 30 as the appropriate treatment. As a result, in a case in which the air volume of the $CO_2$ is not present at the outlet portion, the user stops the rotation of the rotary shaft 13 immediately. This is because the rotation ring 25 or the stationary ring 28 is damaged without occurrence of the sealing gap 30 even when the rotary shaft 13 rotates. In addition, after stopping the rotary shaft 13, the control unit C, again, determines the seal leak amount, and confirms whether or not the detected seal leak amount in a state in which the rotation of the rotary shaft 13 is stopped. In addition, in a case in which the seal leak amount is determined to be outside the allowable range, particularly, a case in which the seal leak amount is excessive, the user immediately stops the rotation of the rotary shaft 13, inspects the rotation ring 25 or the stationary ring 28, and then carries out a measure, such as repair or replacement.

Finally, the control unit C decreases the rotating speed of the circulating pump 34 that is installed in the circulating pipe path 20 shown in FIG. 2, and circulates CO2 supplied from the inside of the machine in the circulating pipe path 20. In addition, finally, the control unit C stops the circulating pump 34, and carries out rated operations (S20).

Figure 8:
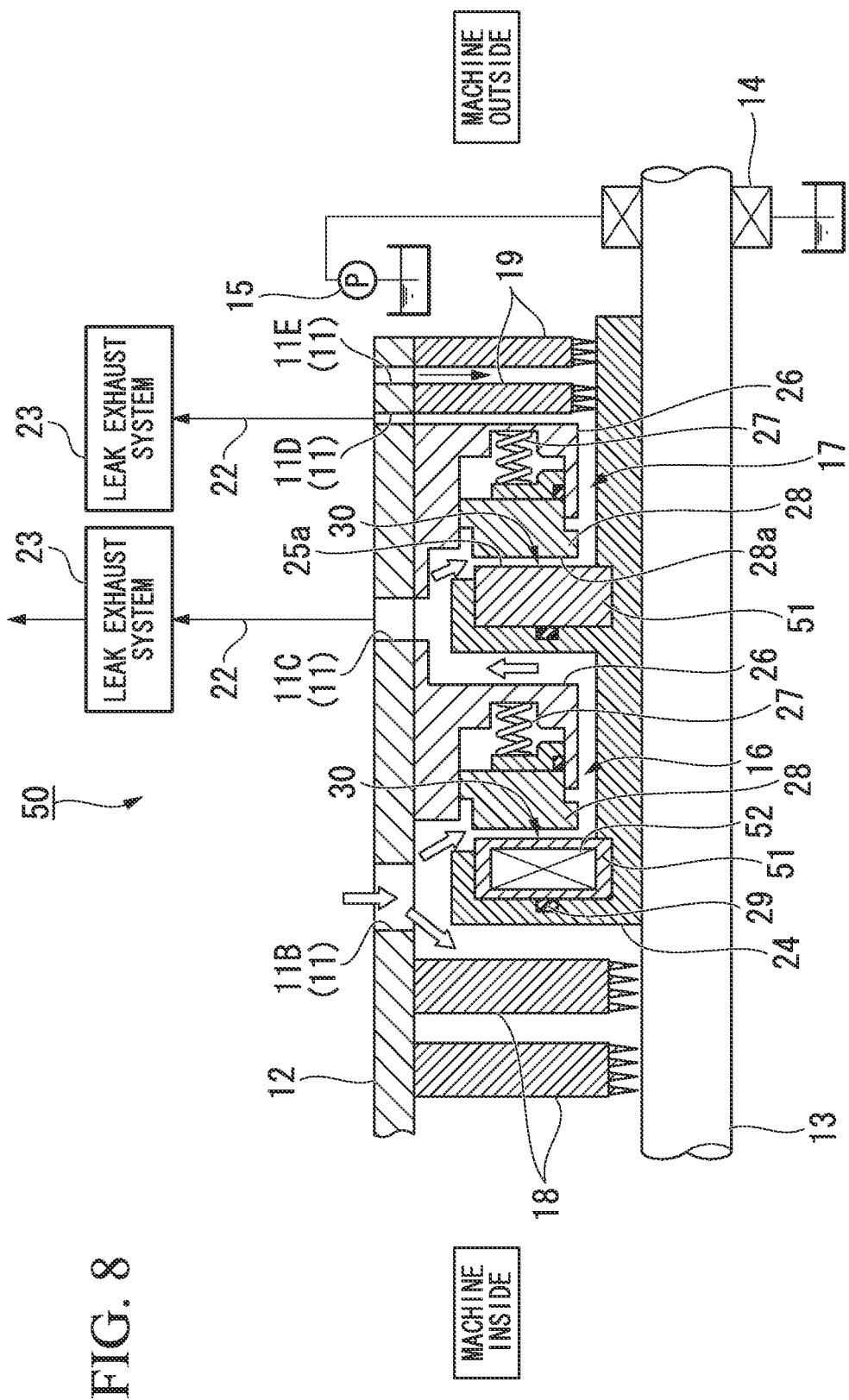
FIG. 8 is a schematic vertical cross-sectional view showing a dry gas seal structure according to a second aspect of the invention.

Next, the configuration of the dry gas seal structure according to a second embodiment will be described. FIG. 8 is a schematic vertical cross-sectional view showing a dry gas seal structure 50 according to the present embodiment. When compared to the dry gas seal structure 10 of the first embodiment, the dry gas seal structure 50 has differences of having a different configuration of the rotation ring 51 of the first seal structure 16 and not having the $CO_2$ circulating system 21. Furthermore, since the other configurations are the same as in the first embodiment, the same reference signals as in FIG. 1 will be given, and description thereof is omitted herein.

The rotation ring 51 of the first seal structure 16 houses the heater 52 therein, and a control unit, not shown, controls operations of the heater 52. In addition, the control unit turns on the heater 52 so as to heat the inlet portion of the sealing gap 30 in the first seal structure 16 to a predetermined temperature before the rotary shaft 13 starting driving. According to such a configuration, space-saving can be achieved compared to the first embodiment. That is, in a configuration in which the inlet portion of the sealing gap 30 in the first seal structure 16 is heated by supplying $CO_2$ heated as in the first embodiment, a space for installing the $CO_2$ circulating system 21 outside of the machine is required. In contrast to the above, in the embodiment, space-saving can be achieved as much as an installation space of the $CO_2$ circulating system 21, since the $CO_2$ circulating system 21 does not need to be installed outside of the machine.

Figure 9A:
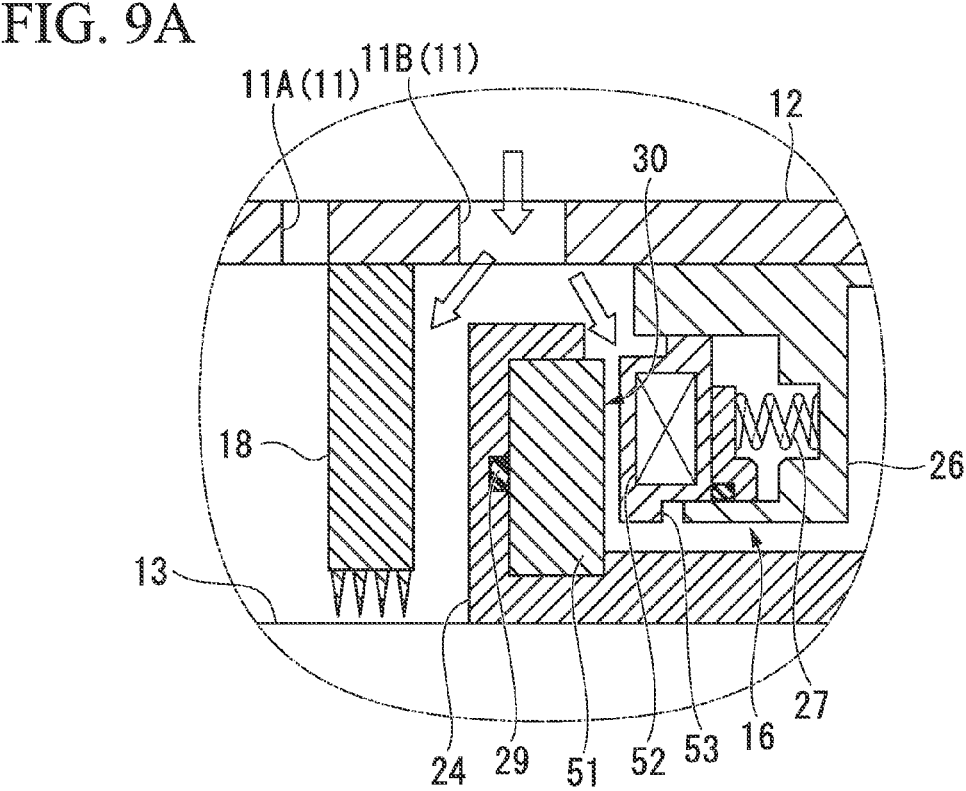
FIG. 9A is a partially enlarged vertical cross-sectional view showing a modification example that is the second aspect.
Figure 9B:
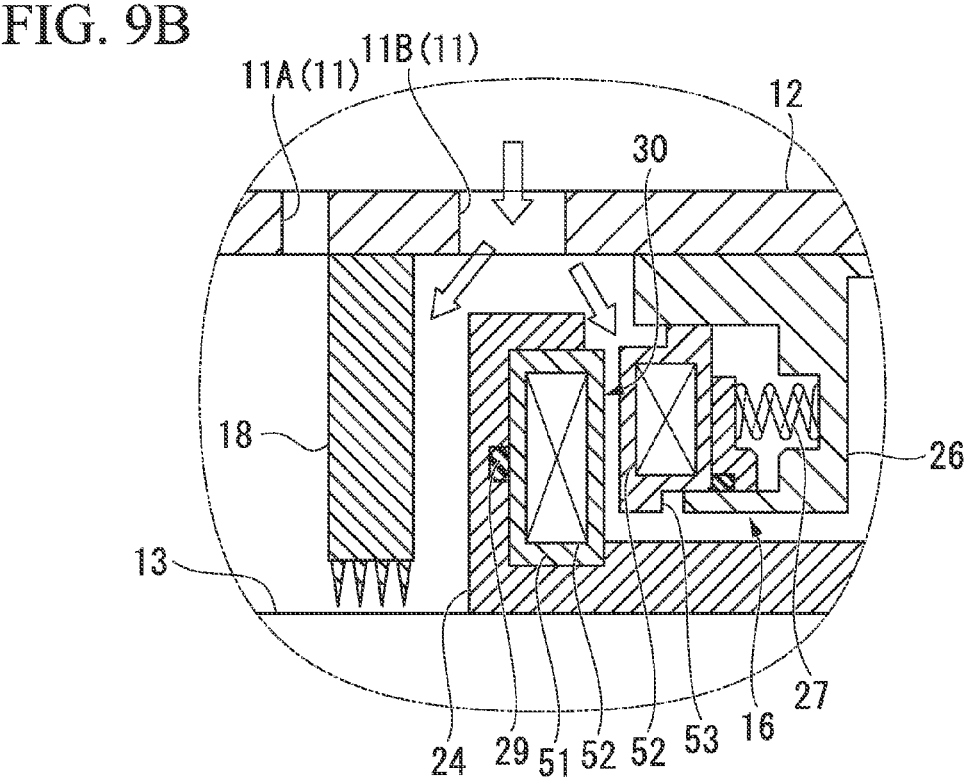
FIG. 9B is a partially enlarged vertical cross-sectional view showing another modification example that is the second aspect.

In addition, FIGS. 9A and 9B are views showing modification examples of the embodiment. In the modification example of FIG. 9A, the heater 52 is housed inside the stationary ring 53. On the other hand, in another modification example of FIG. 9B, the heater 52 is housed inside the rotation ring 51, and the heater 52 is also housed inside the stationary ring 53. In addition, the heaters 52 are turned on so as to heat the inlet portion of the sealing gap 30 in the first seal structure 16 to a predetermined temperature before the rotary shaft 13 starting driving. Furthermore, since, generally, the rotation ring 51 is composed of silicon carbide which is a material that thermal deformation does not easily occur, housing the heater 52 in the rotation ring 51 is preferable since thermal deformation can be suppressed.

Figure 10:
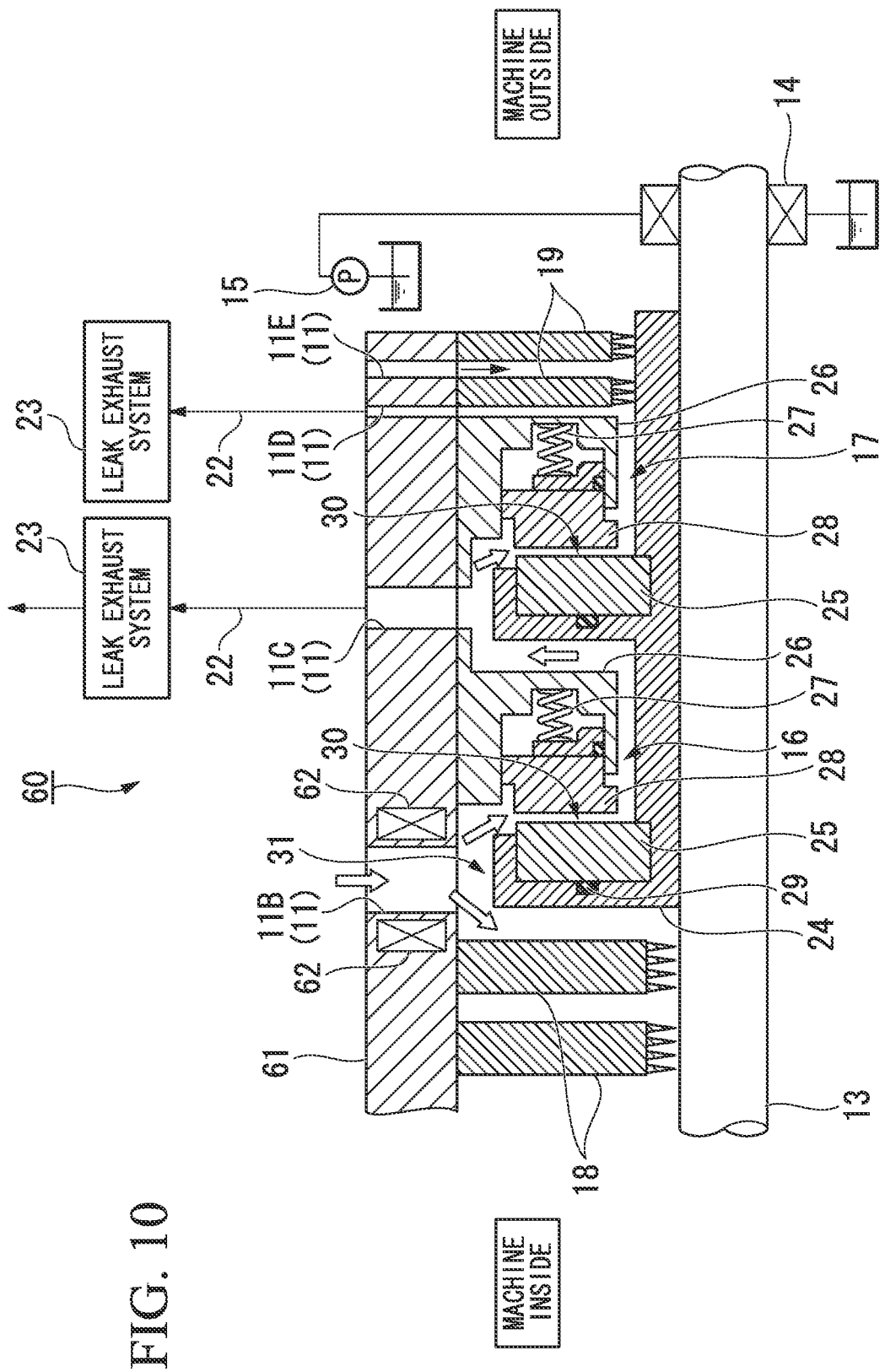
FIG. 10 is a schematic vertical cross-sectional view showing a dry gas seal structure according to a third aspect of the invention.

Next, the configuration of the dry gas seal structure according to a third embodiment will be described. FIG. 10 is a schematic vertical cross-sectional view showing a dry gas seal structure 60 according to the present embodiment. When compared to the dry gas seal structure 10 of the first embodiment, the dry gas seal structure 60 has differences of having a different configuration of a housing 61 and not having the $CO_2$ circulating system 21. Furthermore, since the other configurations are the same as in the first embodiment, the same reference signals as in FIG. 1 will be given, and description thereof is omitted herein.

The housing 61 of the embodiment houses a heater 62 in the vicinity of the second channel 11B. In addition, the heater 62 is turned on so as to heat the inlet portion of the sealing gap 30 in the first seal structure 16 to a predetermined temperature before the rotary shaft 13 starting driving. According to the above configuration, similarly to the second embodiment, there is an advantage that space-saving can be achieved as much as an installation space of the $CO_2$ circulating system 21, since the $CO_2$ circulating system 21 does not need to be installed outside of the machine.

Figure 11:
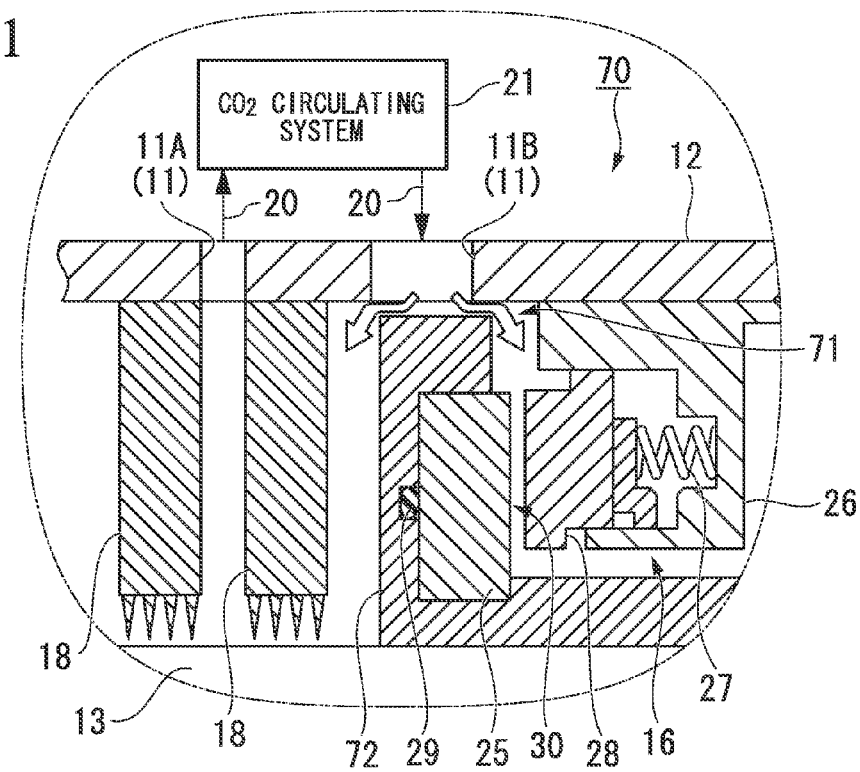
FIG. 11 is a schematic vertical cross-sectional view showing a dry gas seal structure according to a fourth aspect of the invention.

Next, the configuration of the dry gas seal structure according to a fourth embodiment will be described. FIG. 11 is a schematic vertical cross-sectional view showing a dry gas seal structure 70 according to the present embodiment, and an enlarged view of the vicinity of the sealing gap 30. When compared to the dry gas seal structure 10 of the first embodiment, the dry gas seal structure 70 has a difference of the shape of a circulating path 71 that is formed from the second channel 11B to the inlet portion of the sealing gap 30. Furthermore, since the other configurations are the same as in the first embodiment, the same reference signals as in FIG. 1 will be given, and description thereof is omitted herein.

In the embodiment, the vicinity portion of the rotation ring 25 in the shaft sleeve 72 is formed to have a large diameter compared to the first embodiment. Thereby, the circulating path 71 through which $CO_2$ circulates inside the housing 12 has a preceding portion of the sealing gap 30 in the first seal structure 16 formed narrower than other portions. According to the above configuration, while it is necessary to heat the inlet portion of the sealing gap 30 similarly to the first to third embodiments before the rotary shaft 13 starting driving, once the driving of the rotary shaft 13 starts, the temperature of the inlet portion of the sealing gap 30 in the first seal structure 16 increases due to agitation loss caused when $CO_2$ passes through the narrow portion. Therefore, once the driving of the rotary shaft 13 starts, the heaters 37b, 62, and the like, that are used to heat the inlet portion of the sealing gap 30 before the rotary shaft starting driving, can be turned off. Thereby, costs can be reduced as much as the reduction of the running costs of the heaters 37b and 62.

Figure 12:
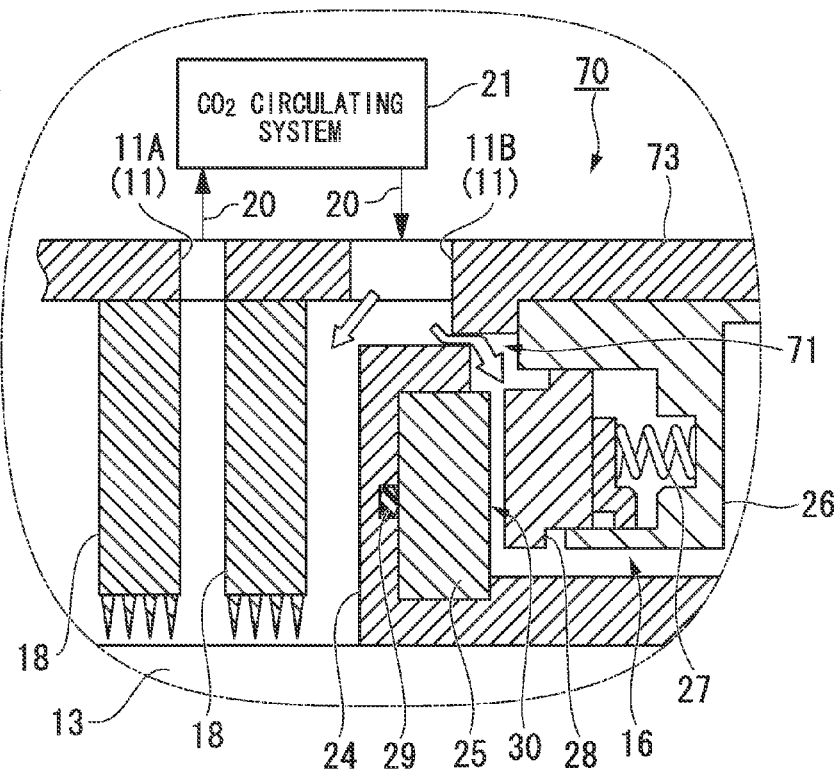
FIG. 12 is a partially enlarged vertical cross-sectional view showing a modification example of the fourth aspect of the invention.
Figure 13:
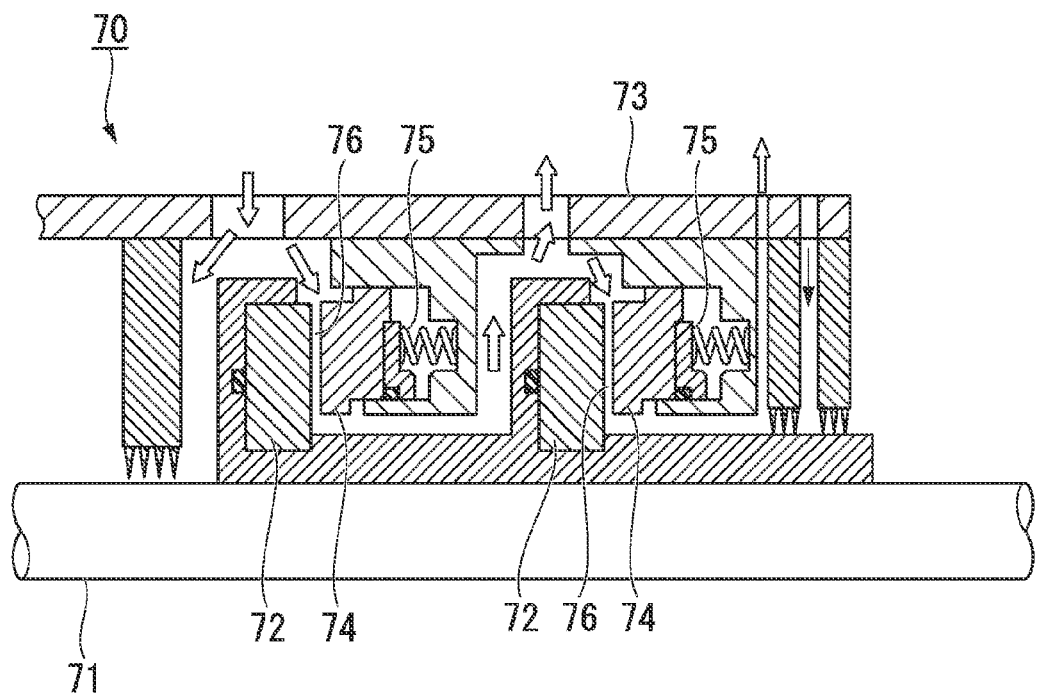
FIG. 13 is a schematic cross-sectional view showing a dry gas seal structure according to the related art.
Figure 14:
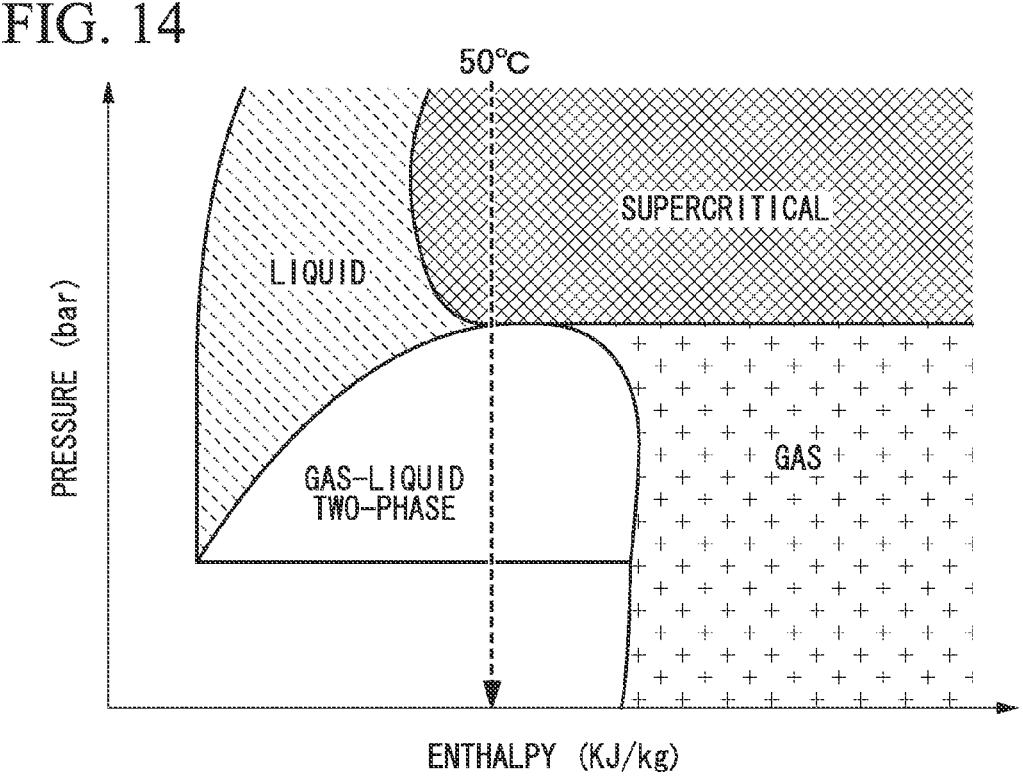
FIG. 14 is a graph showing the relationship between the enthalpy of $CO_2$ and the pressure of $CO_2$ in the dry gas seal structure 70 of the related art.

In addition, FIG. 12 is a view showing a modification example of the embodiment. In the modification example, the vicinity portion of the second channel 11B in the housing 73 is formed to be thicker than other portions. Thereby, the circulating path 71 through which $CO_2$ circulates inside the housing 73 has a preceding portion of the sealing gap 30 in the first seal structure 16 formed narrower than other portions. According to the above configuration, similarly to the fourth embodiment, once the driving of the rotary shaft 13 starts, the temperature of the inlet portion of the sealing gap 30 in the first seal structure 16 increases due to agitation loss caused when $CO_2$ passes through the narrow portion. Therefore, once the driving of the rotary shaft 13 starts, the heaters 37b, 62, and the like, that are used to heat the inlet portion of the sealing gap 30 before the rotary shaft starting driving, can be turned off. Thereby, costs can be reduced as much as the reduction of the running costs of the heaters 37b and 62.

Furthermore, various shapes, combinations, operation procedures, and the like of the component members which have been described in the embodiments are an example, and a variety of modifications are possible based on design requirements and the like within the scope of the purport of the invention.

INDUSTRIAL APPLICABILITY

The invention relates to a dry gas seal structure for sealing a gap between a rotary shaft and a housing in a rotating machine. According to the invention, a stable state of the behaviors of a stationary ring can be maintained.

REFERENCE SIGNS LIST

10 Dry Gas Seal Structure
12 Housing
13 Rotary Shaft
20 Circulating Pipe Path
25 Rotation Ring
28 Stationary Ring
30 Sealing Gap
27 Temperature-Adjusting Device
C Control Unit

The invention claimed is:

1. A rotary machine comprising:
a housing which composes a wall surface of the rotary machine, in which a pressure of a fluid is to be increased so as to be in a supercritical state and which houses the fluid in the supercritical state;
a rotary shaft that penetrates the housing and is rotary-driven;
rotation rings that are around the rotary shaft and rotate integrally with the rotary shaft;
stationary rings that are in the housing and oppose the rotation rings, respectively, wherein opposing surfaces of the stationary rings and the rotation rings contact each other along entire circumferences thereof when the rotary shaft is stopped, and wherein the stationary rings are positioned in a state in which sealing gaps are defined between the rotation rings and the stationary rings when the rotary shaft rotates; and
a circulating system that circulates a portion of the fluid housed in the housing so as to continuously supply the fluid to the sealing gaps between the rotation rings and the stationary rings,
wherein the circulating system comprises:
a circulating pipe path connected to the housing, a first end of the circulating pipe path being connected to a second channel at a location immediately upstream of the sealing gaps, the second channel being an inlet port configured to supply the fluid into the housing, and a second end of the circulating pipe path being connected to a first channel at a location spaced from the second channel, the first channel being an outlet port configured to exhaust the fluid from the housing,
a supply pipe path extending from an inside of the rotary machine, being connected to the circulating pipe path, and being configured to supply the portion of the fluid to the circulating pipe path,
a circulating pump in the circulating pipe path between a connection of the circulating pipe path to the first channel and a connection of the circulating pipe path to the second channel, the circulating pump being configured to deliver the fluid,
a temperature-adjusting device in the circulating pipe path between the connection of the circulating pipe path to the first channel and the connection of the circulating pipe path to the second channel, the temperature-adjusting device being configured to adjust a temperature of the fluid in the circulating pipe path, and
a control unit that controls operation of the temperature-adjusting device,
a flow meter which measures a flow amount of the fluid in the circulating pipe path, and
a display screen or a speaker on the control unit, the display screen being configured to show an alarm or the speaker being configured to sound a warning alarm,
wherein the rotation rings and the stationary rings defining the sealing gaps are heated at inlet portions of the sealing gaps to a predetermined temperature by heated fluid before the rotary shaft is driven,
wherein the control unit is configured to (i) determine an occurrence of a fluid leak from the circulating pipe path by a measurement value of the flow meter, (ii) provide notification, by the display screen or the speaker, of the fluid leak from the circulating pipe path in a case in which the occurrence of the fluid leak from the circulating pipe path is determined, (iii) determine whether an amount of a fluid leak from the sealing gaps is within an allowed range, and (iv) announce, by the display screen or the speaker, that the amount of the fluid leak from the sealing gaps is not within the allowed range in a case in which the occurrence of the fluid leak from the circulating pipe path is not determined.

2. The rotary machine according to claim 1, wherein the temperature-adjusting device has a heater that heats the fluid in the circulating pipe path, wherein the heater uses heat energy of circulating pump loss caused in the circulating pump or lubricating oil pump loss caused in a lubricating oil pump as a heat source, the lubricating oil pump being configured to supply a lubricant to a bearing which rotatably supports the rotary shaft.

3. The rotary machine according to claim 2,
wherein a circulating path, which is defined inside the housing and in which the fluid in the supercritical state flows, is defined so that respective portions of the circulating path immediately upstream of the sealing gaps are narrower than other portions of the circulating path.

4. The rotary machine according to claim 1,
wherein a circulating path, which is defined inside the housing and in which the fluid in the supercritical state flows, is defined so that respective portions of the circulating path immediately upstream of the sealing gaps are narrower than other portions of the circulating path.

5. The rotary machine according to claim 1,
wherein the circulating system further comprises:
a filter between the connection of the circulating pipe path to the first channel and the connection of the circulating pipe path to the second channel, the filter being configured to remove foreign substances; and
a pressure difference meter configured to detect a filter pressure difference on an upper stream side of the filter and a downstream side of the filter,
wherein the control unit is configured to (i) detect a measurement value of the pressure difference meter, (ii) detect whether the measurement value of the pressure difference meter reaches a predefined filter exchange pressure difference, and (iii) provide notification, by the display screen or the speaker, of a necessity of exchanging the filter in a case in which the measurement value of the pressure difference meter reaches the predefined filter exchange pressure difference.

6. A rotary machine comprising:
a housing which composes a wall surface of the rotary machine, in which a pressure of a fluid is to be increased so as to be in a supercritical state and which houses the fluid in the supercritical state;

a rotary shaft that penetrates the housing and is rotary-driven;

rotation rings that are around the rotary shaft and rotate integrally with the rotary shaft;

stationary rings that are in the housing and oppose the rotation rings, respectively, wherein opposing surfaces of the stationary rings and the rotation rings contact each other along entire circumferences thereof when the rotary shaft is stopped, and wherein the stationary rings are positioned in a state in which sealing gaps are defined between the rotation rings and the stationary rings when the rotary shaft rotates;

a heater that is housed within any one of the rotation rings and the stationary rings; and a circulating system that circulates a portion of the fluid housed in the housing so as to continuously supply the fluid to the sealing gaps between the rotation rings and the stationary rings, wherein the circulating system comprises:
    a circulating pipe path connected to the housing, a first end of the circulating pipe path being connected to a second channel at a location immediately upstream of the sealing gaps, the second channel being an inlet port configured to supply the fluid into the housing, and a second end of the circulating pipe path being connected to a first channel at a location spaced from the second channel, the first channel being an outlet port configured to exhaust the fluid from the housing,
    a supply pipe path extending from an inside of the rotary machine, being connected to the circulating pipe path, and being configured to supply the portion of the fluid to the circulating pipe path,
    a circulating pump in the circulating pipe path between a connection of the circulating pipe path to the first channel and a connection of the circulating pipe path to the second channel, the circulating pump being configured to deliver the fluid, and
    a control unit that controls operation of the heater,
    a flow meter which measures a flow amount of the fluid in the circulating pipe path, and
    a display screen or a speaker on the control unit, the display screen being configured to show an alarm or the speaker being configured to sound a warning alarm, wherein the rotation rings and the stationary rings defining the sealing gaps are heated at inlet portions of the sealing gaps to a predetermined temperature by the heater before the rotary shaft is driven, wherein the control unit is configured to (i) determine an occurrence of a fluid leak from the circulating pipe path by a measurement value of the flow meter, (ii) provide notification, by the display screen or the speaker, of the fluid leak from the circulating pipe path in a case in which the occurrence of the fluid leak from the circulating pipe path is determined, (iii) determine whether an amount of a fluid leak from the sealing gaps is within an allowed range, and (iv) announce, by the display screen or the speaker, that the amount of the fluid leak from the sealing gaps is not within the allowed range in a case in which in which the occurrence of the fluid leak from the circulating pipe path is not determined.

7. The rotary machine according to claim 6,
wherein a circulating path, which is defined inside the housing and in which the fluid in the supercritical state flows, is defined so that respective portions of the circulating path immediately upstream of the sealing gaps are narrower than other portions of the circulating path.

8. The rotary machine according to claim 6,
wherein the circulating system further comprises:
a filter between the connection of the circulating pipe path to the first channel and the connection of the circulating pipe path to the second channel, the filter being configured to remove foreign substances; and
a pressure difference meter configured to detect a filter pressure difference on an upper stream side of the filter and a downstream side of the filter,
wherein the control unit is configured to (i) detect a measurement value of the pressure difference meter, (ii) detect whether the measurement value of the pressure difference meter reaches a predefined filter exchange pressure difference, and (iii) provided notification, by the display screen or the speaker, of a necessity of exchanging the filter in a case in which the measurement value of the pressure difference meter reaches the predefined filter exchange pressure difference.

9. A rotary machine comprising:
a housing which composes a wall surface of the rotary machine, in which a pressure of a fluid is to be increased to be in a supercritical state and which houses the fluid in the supercritical state;

a rotary shaft that penetrates the housing and is rotary-driven;

rotation rings that are around the rotary shaft and rotate integrally with the rotary shaft;

stationary rings that are in the housing and oppose the rotation rings, respectively, wherein opposing surfaces of the stationary rings and the rotation rings contact each other along entire circumferences thereof when the rotary shaft is stopped, and wherein the stationary rings are positioned in a state in which sealing gaps are defined between the rotation rings and the stationary rings when the rotary shaft rotates;

a heater that is housed in the housing in a vicinity of a second channel at a location immediately upstream of the sealing gaps, the second channel being an inlet port configured to supply the fluid into the housing; and a circulating system that circulates a portion of the fluid housed in the housing so as to continuously supply the fluid to the sealing gaps between the rotation rings and the stationary rings, wherein the circulating system comprises:
    a circulating pipe path connected to the housing, a first end of the circulating pipe path being connected to the second channel, and a second end of the circulating pipe path being connected to a first channel at a location spaced from the second channel, the first channel being an outlet port configured to exhaust the fluid from the housing,
    a supply pipe path extending from an inside of the rotary machine, being connected to the circulating pipe path, and being configured to supply the portion of the fluid to the circulating pipe path,
    a circulating pump in the circulating pipe path between a connection of the circulating pipe path to the first channel and a connection of the circulating pipe path to the second channel, the circulating pump being configured to deliver the fluid, and
    a control unit that controls operation of the heater,
    a flow meter which measures a flow amount of the fluid in the circulating pipe path; and a display screen or a speaker on the control unit, the display screen being configured to show an alarm or the speaker being configured to sound a warning alarm, wherein the rotation rings and the stationary rings defining the sealing gaps are heated at inlet portions of the sealing gaps to a predetermined temperature by the heater before the rotary shaft is driven, wherein the control unit is configured to (i) determine an occurrence of a fluid leak from the circulating pipe path by a measurement value of the flow meter, (ii) provide notification, by the display screen or the speaker, of the fluid leak from the circulating pipe path in a case in which the occurrence of the fluid leak from the circulating pipe path is determined, (iii) determine whether an amount of a fluid leak from the sealing gaps is within an allowed range, and (iv) announce, by the display screen or the speaker, that the amount of the fluid leak from the sealing gaps is not within the allowed range in a case in which in which the occurrence of the fluid leak from the circulating pipe path is not determined.

10. The rotary machine according to claim 9, wherein a circulating path, which is defined inside the housing and in which the fluid in the supercritical state flows, is defined so that respective portions of the circulating path immediately upstream of the sealing gaps are narrower than other portions of the circulating path.

11. The rotary machine according to claim 9, wherein the circulating system further comprises:

a filter between the connection of the circulating pipe path to the first channel and the connection of the circulating pipe path to the second channel, the filter being configured to remove foreign substances; and a pressure difference meter configured to detect a filter pressure difference on an upper stream side of the filter and a downstream side of the filter;

wherein the control unit is configured to (i) detect a measurement value of the pressure difference meter, (ii) detect whether the measurement value of the pressure difference meter reaches a predefined filter exchange pressure difference, and (iii) provide notification, by the display screen or the speaker, of a necessity of exchanging the filter in a case in which the measurement value of the pressure difference meter reaches the predefined filter exchange pressure difference.

* * * * *